(12) United States Patent
Honma et al.

(10) Patent No.: US 10,708,707 B2
(45) Date of Patent: Jul. 7, 2020

(54) AUDIO PROCESSING APPARATUS AND METHOD AND PROGRAM

(71) Applicant: Sony Corporation, Tokyo (JP)

(72) Inventors: Hiroyuki Honma, Chiba (JP); Minoru Tsuji, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/303,717

(22) PCT Filed: May 17, 2017

(86) PCT No.: PCT/JP2017/018500
§ 371 (c)(1),
(2) Date: Nov. 21, 2018

(87) PCT Pub. No.: WO2017/208821
PCT Pub. Date: Dec. 7, 2017

(65) Prior Publication Data
US 2019/0253828 A1    Aug. 15, 2019

(30) Foreign Application Priority Data

May 30, 2016   (JP) ................. 2016-107043

(51) Int. Cl.
*H04R 5/02*  (2006.01)
*H04S 7/00*  (2006.01)
(Continued)

(52) U.S. Cl.
CPC .............. *H04S 7/40* (2013.01); *G06F 3/0481* (2013.01); *G06F 3/165* (2013.01); *H04S 7/30* (2013.01);
(Continued)

(58) Field of Classification Search
CPC ...................................................... H04R 5/02
See application file for complete search history.

(56) References Cited

U.S. PATENT DOCUMENTS

2010/0328423 A1   12/2010  Etter
2014/0126754 A1    5/2014  Mizuta
(Continued)

FOREIGN PATENT DOCUMENTS

JP    2006-128818 A    5/2006
JP    2013-162285 A    8/2013
(Continued)

OTHER PUBLICATIONS

Written Opinion and English translation thereof dated Jul. 11, 2017 in connection with International Application No. PCT/JP2017/018500.
(Continued)

*Primary Examiner* — Olisa Anwah
(74) *Attorney, Agent, or Firm* — Wolf, Greenfield & Sacks, P.C.

(57) ABSTRACT

The present technology relates to an audio processing apparatus and method and a program that are configured to adjust audio characteristics more easily.
This audio processing apparatus has a display control unit configured, on the basis of object positional information of an audio object, to cause a display unit to display an audio object information image indicative of a position of the audio object and a selection unit configured to select the predetermined audio object from among one or a plurality of the audio objects. The present technology is applicable to video/audio processing apparatuses.

11 Claims, 10 Drawing Sheets

(51) Int. Cl.
*G06F 3/0481* (2013.01)
*G06F 3/16* (2006.01)
(52) U.S. Cl.
CPC ....... *H04S 2400/11* (2013.01); *H04S 2400/13* (2013.01)

(56) References Cited

U.S. PATENT DOCUMENTS

2014/0300636 A1    10/2014  Miyazaya et al.
2014/0369506 A1*   12/2014  Arrasvuori ............ G01S 3/8083
                                                            381/17

FOREIGN PATENT DOCUMENTS

JP       2014-090910 A      5/2014
WO    WO 2013/144417 A1    10/2013

OTHER PUBLICATIONS

International Preliminary Report on Patentability and English translation thereof dated Dec. 13, 2018 in connection with International Application No. PCT/JP2017/018500.
Extended European Search Report dated May 9, 2019 in connection with European Application No. 17806379.8.
International Search Report and English translation thereof dated Jul. 11, 2017 in connection with International Application No. PCT/JP2017/018500.
No Author Listed, information technology—High efficiency coding and media delivery in heterogeneous environments—Part 3: 3D audio, International Standard, ISO/IEC 23008-03, First Edition Oct. 15, 2015, Corrected Version Feb. 1, 2016, 439 pages.

* cited by examiner

FIG. 3

| Syntax | No. of bits | Mnemonic |
|---|---|---|
| object_metadata () { | | |
|   for ( i=0; i < num_objects; i++) { | | |
|     position_azimuth[i]; | 8 | tcimsbf |
|     position_elevation[i]; | 6 | tcimsbf |
|     position_radius[i]; | 4 | uimsbf |
|     gain_factor[i]; | 7 | tcimsbf |
|   } | | |
| } | | |

AUDIO PROCESSING APPARATUS AND METHOD AND PROGRAM

CROSS-REFERENCE TO RELATED APPLICATIONS

This application is a U.S. National Stage under 35 U.S.C. § 371 of International Application No. PCT/JP2017/018500 filed in the Japan Patent Office on May 17, 2017, which claims priority to Japanese Patent Application No. 2016-107043 filed in the Japan Patent Office on May 30, 2016, each application of which is incorporated by reference herein.

TECHNICAL FIELD

The present technology relates to an audio processing apparatus and method and a program and, more particularly, to an audio processing apparatus and method and a program that are configured to adjust audio characteristics more easily.

BACKGROUND ART

In recent years, object audio technologies are in use in movies, games, and so on and coding schemes that can handle object audio have also been developed. For example, the MPEG (Moving Picture Experts Group)-H Part 3: 3D audio standard that is an international standard is known as a standard related with the coding of object audio (refer to NPL 1 below, for example).

With an encoding scheme as mentioned above, as with the related-art 2-channel stereo scheme and multi-channel stereo schemes such as the 5.1-channel, moving audio sources and so on can be handled as audio objects so as to encode, as metadata, the positional information of audio objects along with the signal data of the audio objects. This arrangement facilitates the easy manipulation of a particular sound source at the time of reproduction that has been difficult to practice with related-art encoding schemes. To be more specific, this arrangement allows the volume adjustment and the addition of effects for each audio object as the manipulation of a particular sound source, for example.

CITATION LIST

Non-Patent Literature

[NPL 1]
INTERNATIONAL STANDARD ISO/IEC 23008-3 First edition 2015-10-15 Information technology-High efficiency coding and media delivery in heterogeneous environments-Part 3: 3D audio

SUMMARY

Technical Problems

However, it has been difficult to practice volume adjustment and so on of audio objects at the time of reproducing video including audio object bit streams encoded with such object audio encoding technology as mentioned above.

To be more specific, in the case where a desired audio object is selected from two or more audio objects so as to execute volume adjustment and so on, it is extremely difficult to correctly select the desired audio object only by listening to the outputted sound.

Therefore, the present technology addresses the above-identified and other problems associated with related-art methods and apparatuses and solves the addressed problems by an apparatus, a method, and a program that are configured to adjust audio characteristics with more ease.

Solution to Problems

An audio processing apparatus according to an aspect of the present technology has a display control unit configured, on a basis of object positional information of an audio object, to cause a display unit to display an audio object information image indicative of a position of the audio object, and a selection unit configured to select the predetermined audio object from among one or a plurality of the audio objects.

The audio processing apparatus can further have a parameter setting unit configured to set a parameter related with audio of the audio object selected by the selection unit.

The audio processing apparatus can further have a signal adjustment unit configured, on a basis of the parameter, to execute processing of adjusting audio characteristics of audio of the audio object on at least one of an audio object signal of the audio object and a background sound signal of a background sound.

The parameter can be a parameter for one of volume adjustment and sound quality adjustment.

The audio processing apparatus can further have a rendering processing unit configured to execute rendering processing on an audio object signal of the audio object.

The parameter can be a parameter for specifying a position of the audio object, and the rendering processing unit executes the rendering processing on the basis of the parameter.

The display control unit can cause the audio object information image to be displayed, in a superimposed manner, on a position determined by the object positional information on a video accompanied with the audio of the audio object displayed on the display unit.

If the position determined by the object positional information is outside a display screen of the display unit, the display control unit can cause the audio object information image to be displayed at an end portion of the display screen.

The selection unit can select the audio object in accordance with a specification manipulation by a user at the position of the audio object information image.

The audio processing apparatus can further have an audio object decoding unit configured to decode an audio object bit stream so as to obtain an audio object signal of the audio object and the object positional information.

An audio processing method or a program according to another aspect of the present technology has the steps of, on a basis of object positional information of an audio object, causing a display unit to display an audio object information image indicative of a position of the audio object, and selecting the predetermined audio object from among one or a plurality of the audio objects.

In one aspect of the present technology, on the basis of the object positional information of the audio object, the audio object information image indicative of the position of the audio object is displayed on the display unit and the predetermined audio object is selected from one or a plurality of audio objects.

Advantageous Effects of Invention

According to one aspect of the present technology, audio characteristics can be adjusted more easily.

BRIEF DESCRIPTION OF DRAWINGS

FIG. 3 is a diagram describing audio object information.

DESCRIPTION OF EMBODIMENTS

The following describes embodiments to which the present technology is applied with reference to drawings.

A First Embodiment

<A Configurational Example of the Video/Audio Processing Apparatus>

The present technology is configured to visualize the positional information of an audio object by displaying, in a superimposed manner, an image such as a rectangular frame, for example, indicating that the audio object exists at a corresponding position on a display screen of a display apparatus on the basis of the object positional information in the audio object bit stream. Further, with the present technology, if an audio object is outside a display range on a display screen, an image is displayed along with the information indicative that the audio object is outside the display range in a direction corresponding to a display screen frame in a superimposed manner so as to visualize the positional information of an audio object. This arrangement allows a device user to select an audio object on the basis of the displayed information, thereby manipulating volume adjustment and so on with ease.

Figure 1:
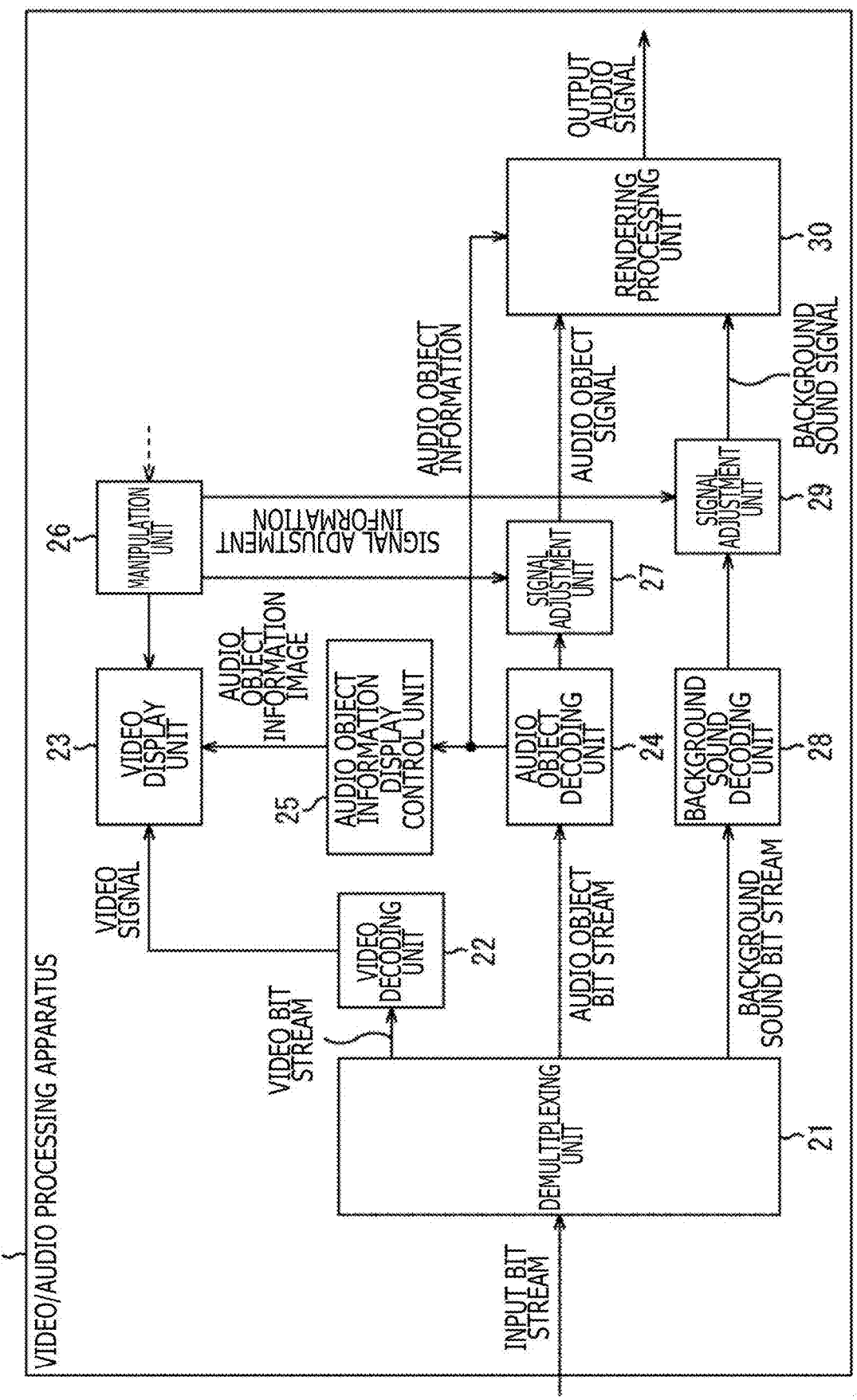
FIG. 1 is a diagram illustrating a configurational example of a video/audio processing apparatus.

FIG. 1 is a diagram illustrating a configurational example of one embodiment of a video/audio processing apparatus to which the present technology is applied.

A video/audio processing apparatus 11 indicated in FIG. 1 has a demultiplexing unit 21, a video decoding unit 22, a video display unit 23, an audio object decoding unit 24, an audio object information display control unit 25, a manipulation unit 26, a signal adjustment unit 27, a background sound decoding unit 28, a signal adjustment unit 29, and rendering processing unit 30.

To this video/audio processing apparatus 11, an input bit stream for reproducing content including video and audio is supplied. To be more specific, the content obtained from an input bit stream includes a video, the audio of an audio object accompanying this video, and a background sound.

It should be noted that the effects described here are not restrictive, so that any other effects described in the present disclosure are valid.

The demultiplexing unit 21 demultiplexes the input bit stream supplied from the outside into a video bit stream, an audio object bit stream, and a background sound bit stream.

Here, the video bit stream is a bit stream that includes a video signal for reproducing the video (or the image) of content and the demultiplexing unit 21 supplies the video bit stream obtained by demultiplexing to the video decoding unit 22.

Also, the audio object bit stream is a bit stream that includes, of the audio signals for reproducing the audio accompanying the video of content, an audio object signal for reproducing the audio of an audio object and the audio object information that is the metadata of this audio object.

The demultiplexing unit 21 supplies the audio object bit stream obtained by demultiplexing to the audio object decoding unit 24.

Further, of the audio signals for reproducing the audio accompanying the video of content, the background sound bit stream is a bit stream that includes other audios than the audio of an audio object, that is, a background sound signal for reproducing background sound. The demultiplexing unit 21 supplies the background sound bit stream obtained by demultiplexing to the background sound decoding unit 28.

The video decoding unit 22 decodes the video bit stream supplied from the demultiplexing unit 21 and supplies a resultant video signal to the video display unit 23.

The video display unit 23, including, for example, a display device such as a liquid crystal display panel, displays the video (or the image) of content on the basis of the video signal supplied from the video decoding unit 22.

The audio object decoding unit 24 decodes the audio object bit stream supplied from the demultiplexing unit 21 to as to obtain audio object information and an audio object signal.

The audio object decoding unit 24 supplies the audio object information obtained by decoding to the audio object information display control unit 25 and the rendering processing unit 30 and, at the same time, supplies the audio object signal obtained by decoding to the signal adjustment unit 27.

On the basis of the audio object information supplied from the audio object decoding unit 24, the audio object information display control unit 25 generates an audio object information image that is image information indicative of the position of the audio object and supplies the generated audio object information image to the video display unit 23. The video display unit 23 displays, in a superimposed manner, the audio object information image supplied from the audio object information display control unit 25 on the video of content displayed on the basis of the video signal supplied from the video decoding unit 22, thereby visually presenting the position of the audio object to the user of the device.

The manipulation unit 26 has a receiving unit for receiving signals from a remote controller, a touch panel arranged on the video display unit 23, buttons, a mouse, and a keyboard, for example, and receives manipulative operations done by the user so as to output signals in accordance with a manipulation by the user.

To be more specific, the device user manipulates the manipulation unit 26 while watching the audio object information image displayed on the video display unit 23 and executes a manipulation for adjusting the audio characteristics such as volume adjustment and so on of the audio of the selected audio object. Receiving the audio characteristics adjustment manipulation done by the user, the manipulation unit 26 generates signal adjustment information for adjusting the audio characteristics in accordance with the manipulation, supplying the generated signal adjustment information to the signal adjustment unit 27 or the signal adjustment unit 29.

It should be noted that, in what follows, the description will be continued by supposing that the manipulation unit 26 include a touch panel integrally arranged with the video display unit 23, that is, arranged on the display screen of the video display unit 23 in a superimposed manner.

On the basis of the signal adjustment information supplied from the manipulation unit 26, the signal adjustment unit 27 executes the adjustment of the audio characteristics such as volume adjustment and sound quality adjustment by adjusting the amplitude and so on of the audio object signal supplied from the audio object decoding unit 24, thereby supplying a resultant audio object signal to the rendering processing unit 30.

For example, if the volume as an audio characteristic is adjusted, the amplitude adjustment of an audio object signal is executed. If the sound quality as an audio characteristic is executed, gain adjustment is executed by executing filter processing by use of a filter coefficient for each frequency band of an audio object signal, for example, thereby adding an effect to the audio based on the audio object signal.

The background sound decoding unit 28 decodes the background sound bit stream supplied from the demultiplexing unit 21 and supplies a resultant background sound signal to the signal adjustment unit 29.

On the basis of the signal adjustment information supplied from the manipulation unit 26, the signal adjustment unit 29 executes such adjustments of audio characteristics as volume adjustment and sound quality adjustment by adjusting the amplitude and so on of the background sound signal supplied from the background sound decoding unit 28, thereby supplying a resultant background sound signal to the rendering processing unit 30.

In the video/audio processing apparatus 11, the signal adjustment unit including the signal adjustment unit 27 and the signal adjustment unit 29 executes the processing of adjusting the audio characteristics such as volume and sound quality at least on one of the audio object signal and the background sound signal. Consequently, the audio characteristics of the audio of the audio object are adjusted.

In the adjustment of the audio characteristics of the audio of an audio object, the processing to be appropriately executed on an audio object signal such as relatively increasing the volume of the audio of the audio object by lowering the volume of a background sound, for example, and the processing to be executed on the background sound signal are combined so as to realize the audio characteristics adjustment on the audio of the audio object.

On the basis of the audio object information supplied from the audio object decoding unit 24, the rendering processing unit 30 executes rendering processing on the audio object signal supplied from the signal adjustment unit 27.

In addition, the rendering processing unit 30 executes mixing processing for synthesizing the audio object signal obtained by rendering processing with the background sound signal supplied from the signal adjustment unit 29, thereby outputting a resultant audio signal. Receiving this output audio signal, a speaker reproduces the audio of content on the basis of the output audio signal. At this moment, the audio and the background sound of the audio object as the audio of content are reproduced.

<Description of Content Reproduction Processing>

The following describes an operation of the video/audio processing apparatus 11. That is, the following describes the content reproduction processing to be executed by the video/audio processing apparatus 11 with reference to the flowchart illustrated in FIG. 2.

In step S11, the demultiplexing unit 21 demultiplexes an input bit stream supplied from the outside so as to provide a video bit stream, an audio object bit stream, and a background sound bit stream.

The demultiplexing unit 21 supplies the video bit stream, the audio object bit stream, and the background sound bit stream obtained by demultiplexing to the video decoding unit 22, the audio object decoding unit 24, and the background sound decoding unit 28, respectively.

In step S12, the video decoding unit 22 decodes the video bit stream supplied from the demultiplexing unit 21 and supplies a resultant video signal to the video display unit 23. On the basis of the video signal supplied from the video decoding unit 22, the video display unit 23 displays the image (or the video) of content. That is, the video of content is reproduced.

In step S13, the background sound decoding unit 28 decodes the background sound bit stream supplied from the demultiplexing unit 21 and supplies a resultant background sound signal to the signal adjustment unit 29.

In step S14, the audio object decoding unit 24 decodes the audio object bit stream supplied from the demultiplexing unit 21 so as to obtain audio object information and an audio object signal.

Here, the audio object signal is a waveform signal of the audio of the audio object and an audio object signal is obtained for each of one or more audio objects by decoding an audio object bit stream. For example, an audio object signal is a PCM (Pulse Code Modulation) signal, for example.

On the other hand, the audio object information is the metadata that includes the information indicative of where an audio object that is a sound source is located in the space, this metadata being encoded with a format illustrated in FIG. 3, for example.

In the audio object information illustrated in FIG. 3, "num_objects" is indicative of the number of audio objects included in an audio object bit stream.

Further, "tcimsbf" is the abbreviation of "Two's complement integer, most significant (sign) bit first," the sign bit being indicative of the first two's complement. "uimsbf" is the abbreviation of "Unsigned integer, most significant bit first," the most significant bit being indicative of the first unsigned integer.

Still further, "gain_factor[i]" is indicative of the gain of the i-th audio object included in an audio object bit stream.

"position_azimuth[i]," "position_elevation[i]," and "position_radius[i]" are each indicative of the positional information of the i-th audio objects included in an audio object bit stream.

To be more specific, "position_azimuth[i]" is indicative of the azimuth of the position of an audio object in a spherical coordinate system and "position_elevation[i]" is indicative of the elevation of the object of an audio object in a spherical coordinate system. Further, "position_radius[i]" is indicative of the distance to the position of an audio object, that is, the radius, in a spherical coordinate system.

In what follows, the audio object information including "position_azimuth[i]," "position_elevation[i]," and "position_radius[i]" indicative of the position of an audio object is also referred to as object positional information.

Further, in what follows, the information indicative of the gain of an audio object that is "gain_factor[i]" included in the audio object information is also referred to as gain information.

The audio object information in which the object positional information and gain information of each audio object are included is the metadata of the audio object.

Figure 4:
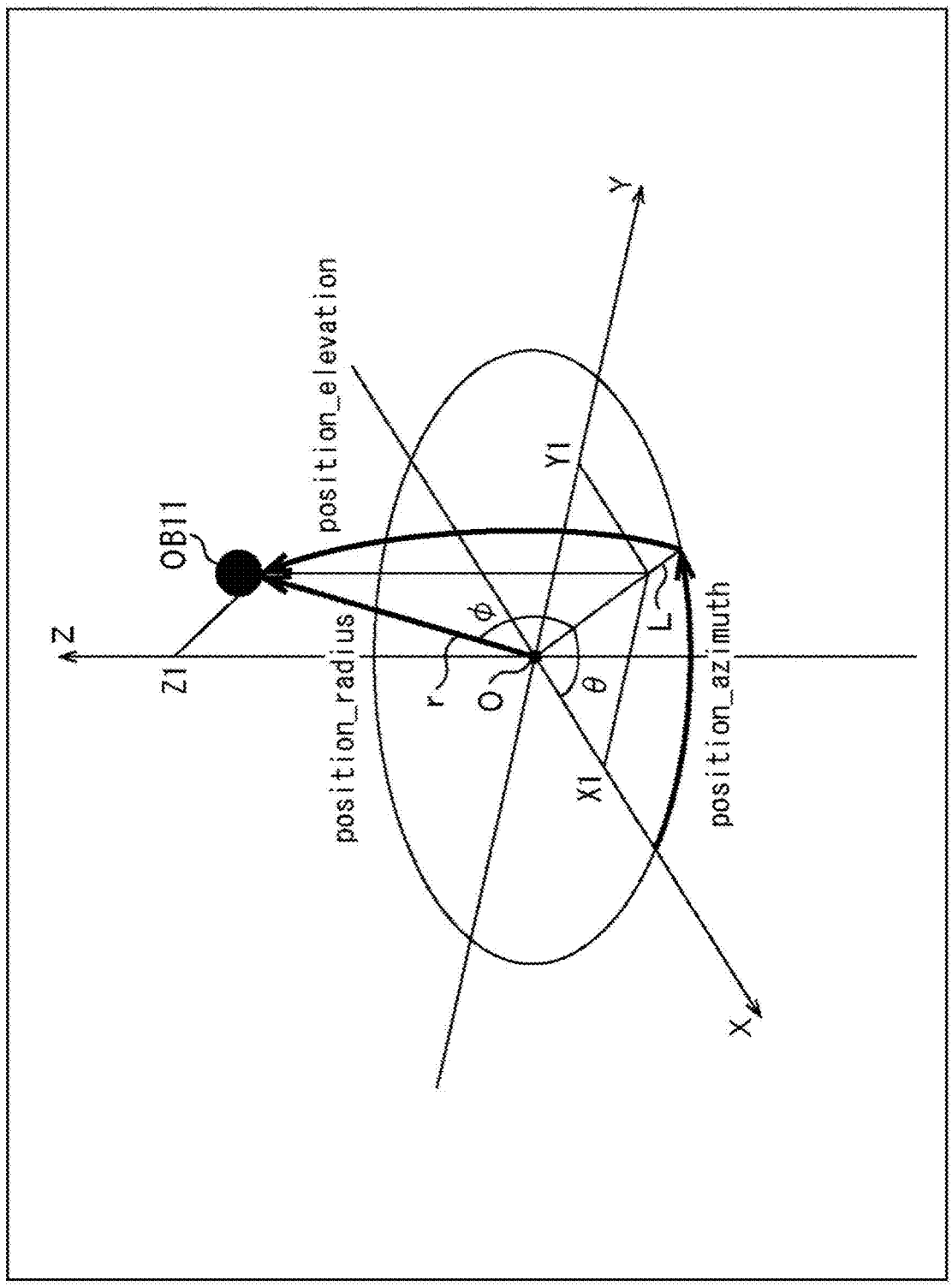
FIG. 4 is a diagram describing a coordinate system of object positional information.

Here, the relation between a spherical coordinate system and a three-dimensional orthogonal coordinate system is as illustrated in FIG. 4.

In FIG. 4, the X-axis, the Y-axis, and the Z-axis that are mutually perpendicular and pass through origin O provide the axes of a three-dimensional orthogonal coordinate system. For example, in a three-dimensional orthogonal coordinate system, the position of an audio object OB11 in the space is expressed as (X1, Y1, Z1) by use of X1 that is the X coordinate indicative of the position along the X-axis, Y1 that is the Y coordinate indicative of the position along the Y-axis, and Z1 that is the Z coordinate indicative of the position along the Z-axis.

On the other hand, in a spherical coordinate system, the position of the audio object OB11 in the space is expressed by use of azimuth position_azimuth, elevation position_elevation, and radius position_radius.

Now, let the straight line connecting the origin O and the position of the audio object OB11 in the space be straight line r and a straight line obtained by projecting this straight line r onto a XY plane be straight line L.

At this moment, angle θ between the X-axis and straight line L azimuth position_azimuth indicative of the position of the audio object OB11. Further, angle φ between straight line r and XY plane the elevation position_elevation indicative of the audio object OB11 and the length of straight line r is radius position_radius indicative of the position of the audio object OB11.

For example, the position of origin O is the position of a user who watches a video (or an image) of content, the positive direction of X direction (the X-axis direction), that is, the forward direction in FIG. 4 is the front direction as seen from the user, and the positive direction of Y direction (the Y-axis direction), that is, the right direction in FIG. 4 is the left direction as seen from the user.

Thus, in the audio object information, the positions of each audio object are represented by spherical coordinates.

The position and gain of an audio object indicated by the audio object information as described above is a physical amount that varies for each predetermined time interval. At the time of content reproduction, the sound image localization position of an audio object can be moved in accordance with the change in the audio object information.

Figure 2:
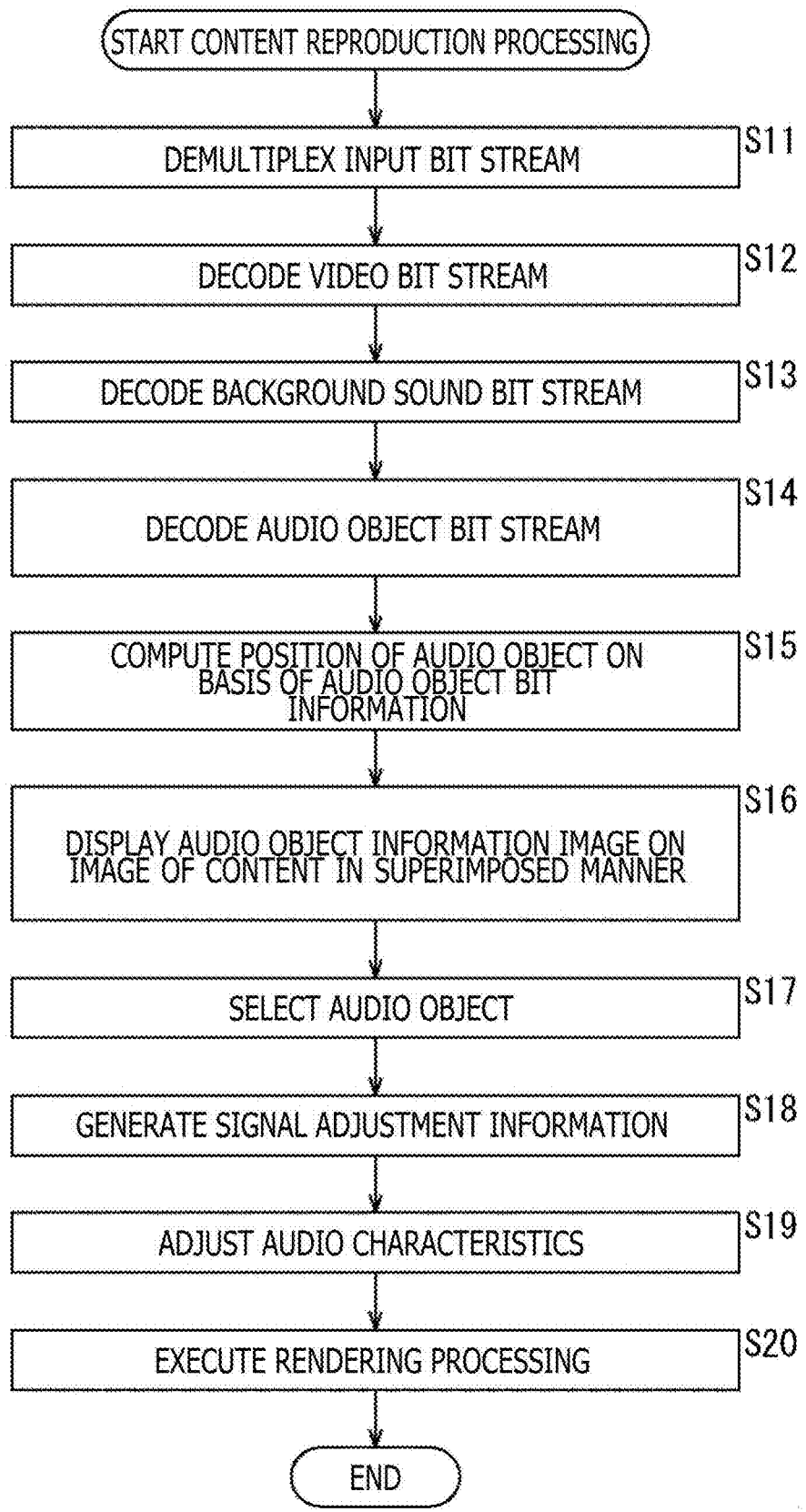
FIG. 2 is a flowchart describing content reproduction processing.

Now return to the description of the flowchart illustrated in FIG. 2. The audio object decoding unit 24 decodes an audio object bit stream so as to obtain audio object information and an audio object signal.

The audio object decoding unit 24 supplies the audio object signal obtained by decoding to the audio object information display control unit 25 and the rendering processing unit 30 and, at the same time, supplies the audio object signal obtained by decoding to the signal adjustment unit 27.

In step S15, the audio object information display control unit 25 computes the position of the audio object on the display screen on the basis of the audio object information supplied from the audio object decoding unit 24.

For example, in the standard "INTERNATIONAL STANDARD ISO/IEC 23008-3 First edition 2015-10-15 Information technology-High efficiency coding and media delivery in heterogeneous environments-Part 3: 3D audio" (hereafter referred to also as reference document 1), the information related with a screen of a reproduction apparatus assumed by a video producing side into a bit stream can be described as the image angle information in horizontal direction and the image angle information in vertical direction; however, if these items of image angle information are not described, default values are used for image angle information.

The following describes an example in which the position of an audio object on a display screen is computed by use of default values of image angle information.

For example, regarding the video display unit 23, let the image angle information indicative of an image angle in the horizontal direction, that is, the Y direction of the video display unit 23 as seen from origin O in the space be screen_azimuth and the vertical direction, that is, the Y direction of the video display unit 23 as seen from origin O in the space be screen_elevation.

At this moment, the default value of image angle information screen_azimuth in the horizontal direction and the default value of the image angle information screen_elevation in the vertical direction are as indicated in the following equation (1).

[Math. 1]

$$\begin{cases} \text{screen\_azimuth} = 29.0° \\ \text{screen\_elevation} = 17.5° \end{cases} \quad (1)$$

Figure 5:
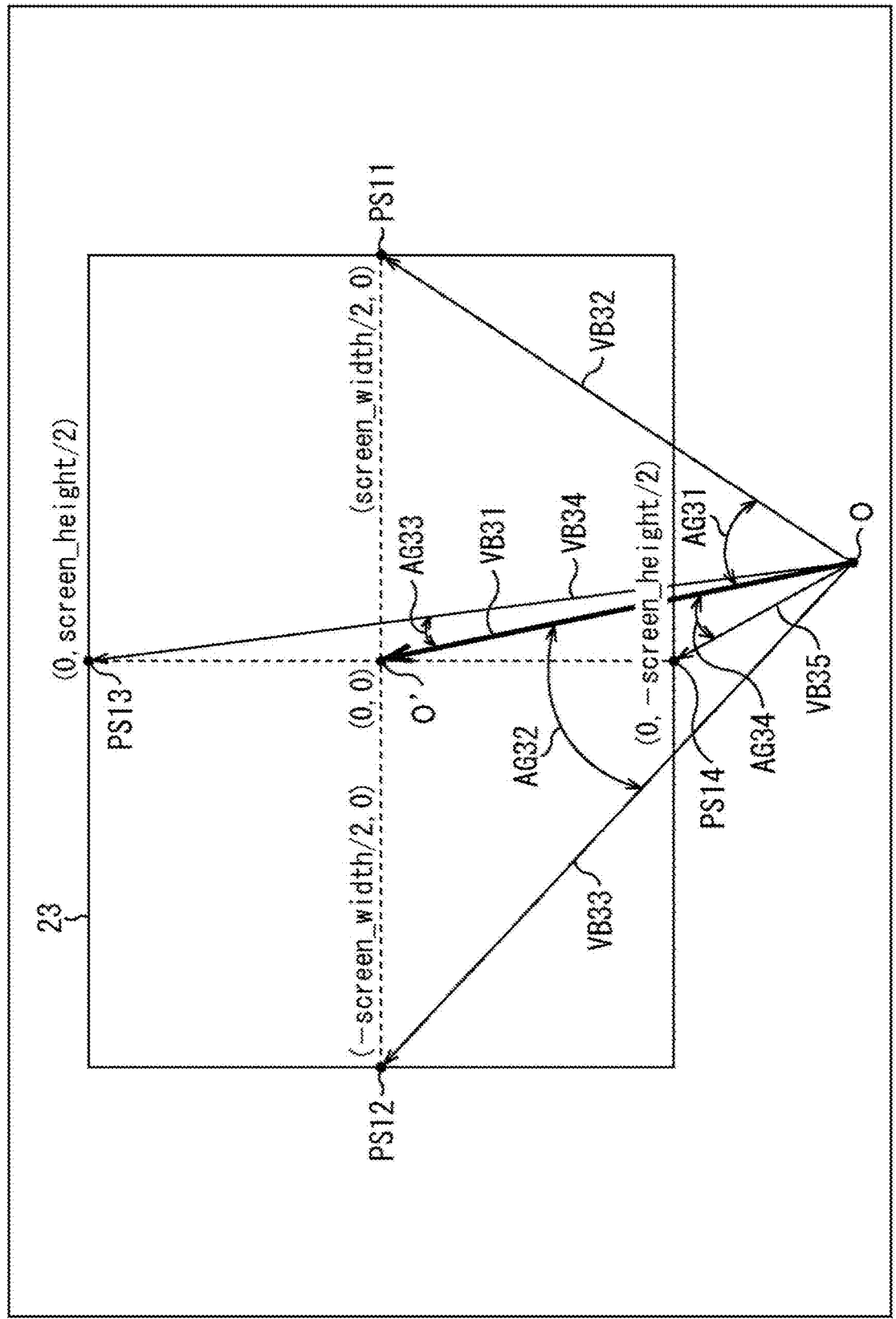
FIG. 5 is a diagram describing a relation between image angle information and a display screen of a video display unit.

Further, the relations between the image angle information screen_azimuth and the image angle information screen_elevation and the display screen of the video display unit 23 are as illustrated in FIG. 5.

In this example, center position O' of the display screen of the video display unit 23 and origin O that is the position of the user in the space are at the same position in the vertical direction in the diagram.

Still further, let a two-dimensional orthogonal coordinate system with center position O' being the origin, the right direction being the positive direction of the x direction in the diagram, and upward direction being the positive direction of the y direction in the diagram be an xy coordinate system, a position on this xy coordinate system being represented as (x, y) by use of the x coordinate and the y coordinate.

Yet further, let the width (length) in the x direction of the display screen of the video display unit 23 be screen_width and the width (length) in the y direction of the display screen of the video display unit 23 be screen_height. It should be note that these screen_width and screen_height are known values.

At this moment, right-side end position PS11 and left-side end position PS12 on the display screen in the drawing of the video display unit 23 are position PS11=(screen_width/2,0) and position PS12=(−screen_width/2,0) by the xy coordinates, respectively.

Likewise, in the drawing of the display screen of the video display unit 23, upper-end position PS 13 and lower end position PS14 are position PS13=(0, screen_height/2) and position PS14=(0, −screen_height/2) by the xy coordinates, respectively.

Further, angle AG31 between vector VB31 with origin O being start point and center position O' being end point and vector VB32 with origin O being start point and position PS11 being end point is −screen_azimuth. Likewise, angle AG32 between vector VB31 and vector VB33 with origin O being start point and position PS12 being end point is screen_azimuth.

In addition, angle AG33 between vector VB31 and vector VB34 with origin O being start point and position PS13 being end point is screen_elevation. Angle AG34 between vector VB31 and vector VB35 with origin O being start point and position PS14 being end point is −screen_elevation.

The audio object information display control unit 25 calculates the equation (2) from image angle information screen_azimuth and image angle information screen_elevation that are default values, lengths screen_width and screen_height of the video display unit 23 that are known values, and the object positional information included in the audio object information, thereby computing the position of the audio object on the display screen of the video display unit 23.

[Math. 2]

$$\begin{cases} x = -\dfrac{\text{screen\_width}}{2} \dfrac{\sin(\text{position\_azimuth})}{\sin(\text{screen\_azimuth})}, \\ |\text{position\_azimuth}| < |\text{screen\_azimuth}| \\ y = \dfrac{\text{screen\_height}}{2} \dfrac{\sin(\text{position\_elevation})}{\sin(\text{screen\_elevation})}, \\ |\text{position\_elevation}| < |\text{screen\_elevation}| \end{cases} \quad (2)$$

It should be noted that, in the equation (2), position_azimuth and position_elevation are indicative of the azimuth and the elevation indicative of the position of the audio object that makes up the object positional information.

If the equation (2) is computed as described above, the x coordinate and the y coordinate that are indicative of the position of an audio object on the display screen of the video display unit 23, that is, the image of content are obtained. In what follows, the position of an audio object on the display screen of the video display unit 23 obtained as described above is also referred to as an object screen position.

It should be noted that, for an audio object that does not satisfy constraint conditions depicted in the equation (2), that is, |position_azimuth|<|screen_azimuth| and |position_elevation|<|screen_elevation|, the audio object information display control unit 25 obtains an object screen position as follows, for example.

That is, if |position_azimuth|<|screen_azimuth| is not satisfied, the x coordinate of the audio object indicated by the object screen position is x=−screen_width/2 if position_azimuth is a positive value; if position_azimuth is a negative value, x=screen_width/2.

If |position_elevation|<|screen_elevation| is not satisfied, the y coordinate of the audio object indicated by the object screen position is y=screen_height/2 if position_elevation is a positive value; if position_elevation is a negative value, y=−screen_height/2.

Therefore, for an audio object that does not satisfy the constraint conditions depicted in the equation (2), the object screen position of that audio object is the position at an end portion of the display screen of the video display unit 23. That is, the object screen position is the position indicated by the image angle information of the video display unit 23.

An audio object that does not satisfy such constraint conditions of the equation (2) as above is an object that is located outside the image not observable on the image of content, that is, an object outside the display screen of the video display unit 23.

Therefore, for an audio object of which object screen position obtained from the object positional information is outside the display screen of the video display unit 23, the position nearest to that object screen position that is the position at an end portion of the display screen of the video display unit 23 is the final object screen position. It should be noted that, if the object screen position is outside the display screen as another case, the intersecting position of the straight line connecting that object screen position and center position O' and the end of the display screen of the video display unit 23 may be used as the final object screen position, for example.

Refer to the description of the flowchart illustrated in FIG. 2 again. In step S16, the audio object information display control unit 25 controls the video display unit 23 on the basis of the object screen position, thereby displaying, in a superimposed manner, an audio object information image indicative of the existence of an audio object on the image (or the video) of content.

This display position of the audio object information image is an object screen position, that is, a position on the display screen of the video display unit 23 that is determined by the object positional information. In other words, the audio object information image is displayed on a position on the image (or the video) of content that is determined by the object positional information.

For example, on the basis of the object screen position obtained by the processing of step S15, the audio object information display control unit 25 generates, as the image information of the audio object information image, the image information for displaying a rectangular frame image that is the image of a rectangular frame having a predetermined size with the object screen position thereof being center. For example, the size of the rectangular frame image may be a predetermined size or a size that is determined by radius position_radius as the object positional information.

However, the rectangular frame image of an audio object that does not satisfy the constraint conditions of the equation (2) above is a rectangular frame image that is different from the rectangular frame image of an audio object that satisfies the constraint conditions. Here, different rectangular frame images are different from each other in the shape or size of rectangular frame or may be different in the display form of color or the like, for example.

The audio object information display control unit 25 supplies the audio object information image generated as described above to the video display unit 23, thereby displaying the audio object information image on the image of content in a superimposed manner.

At this moment, the audio object information image of an audio object of which object screen position does not satisfy the constraint conditions of equation (2), namely, is obtained from the object positional information is outside the display screen of the video display unit 23 is displayed at the position of an end portion of the display screen of the video display unit 23 that is the nearest to that object screen position. That is, the audio object information image is displayed on the end portion on the image of content.

Figure 6:
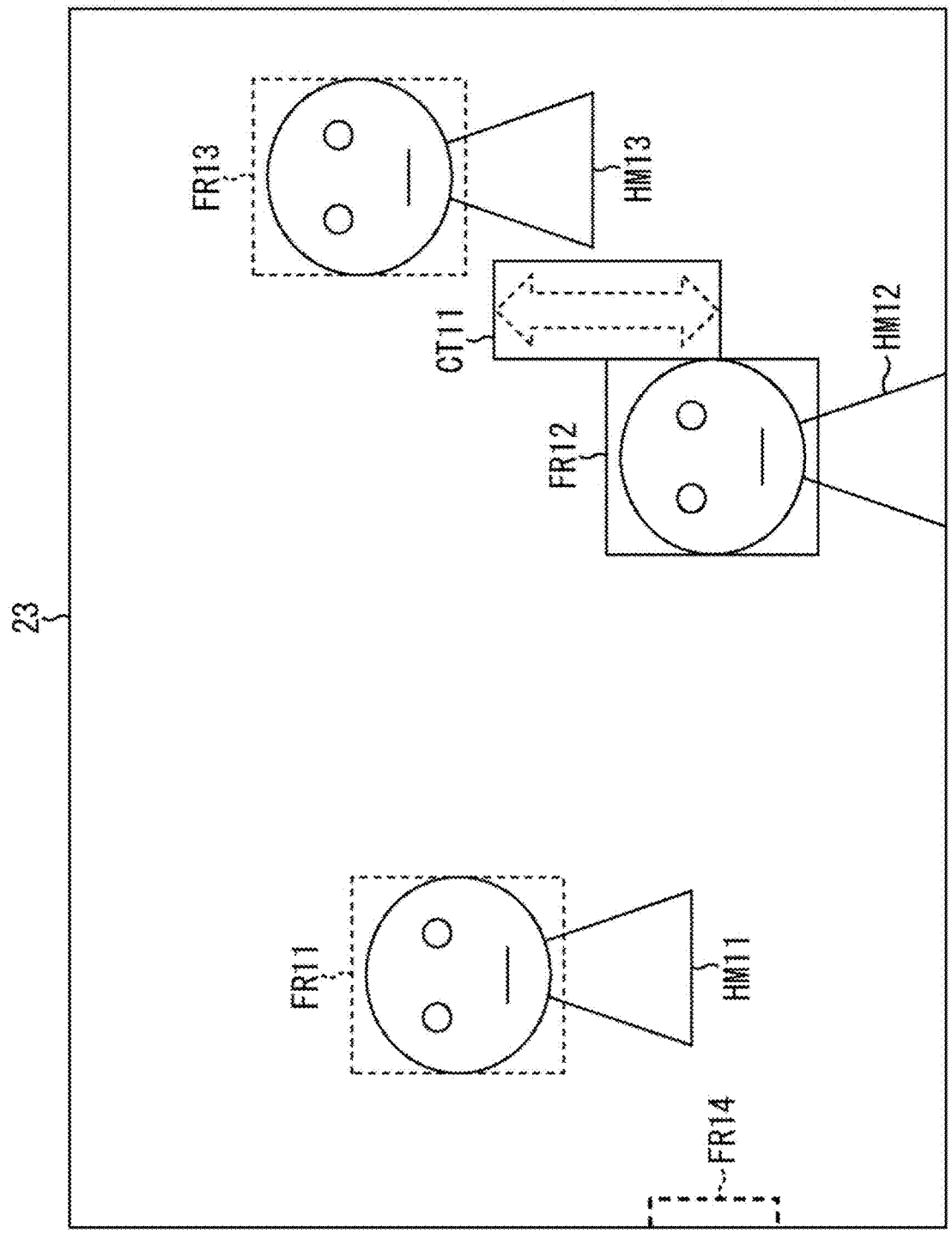
FIG. 6 is a diagram describing the adjustment of audio characteristics of an audio object.

When the processing of step S16 has been executed, an image illustrated in FIG. 6 is displayed on the video display unit 23, for example.

In the example illustrated in FIG. 6, three persons HM11 through MH13 are displayed as audio objects on the image of content displayed on the video display unit 23.

In the portions of the face areas of these persons HM11 through HM13, rectangular frame image FR11 through rectangular frame image FR13 audio object information images are respectively displayed in a superimposed manner. Therefore, watching these rectangular frame image FR11 through rectangular frame image FR13, the user is able to recognize audio objects with ease.

Further, in FIG. 6, a rectangular frame image FR14 indicative of the existence of an audio object that does not satisfy the constraint conditions of equation (2), that is, an audio object that is outside the display screen, is displayed at an end of the display screen of the video display unit 23.

Especially, in this example, the rectangular frame image FR14 is displayed in dashed lines so as to indicate that the audio object corresponding to the rectangular frame image FR14 is outside the display screen. That is, the rectangular frame image FR14 is displayed in a display form that is different from the other rectangular frame image FR11 through the rectangular frame image FR13.

In this example, the rectangular frame image FR11 and the rectangular frame image FR13 are also displayed in dashed lines; in the case of the dashed-line display of the rectangular frame image FR14, however, a display form different from those of these rectangular frame image FR11 and the rectangular frame image FR13 is used for distinction.

Since the audio object corresponding to the rectangular frame image FR14 is located outside the display screen, the user is unable to confirm this audio object on the image of content. However, by watching the rectangular frame image FR14, the user is able to recognize the existence of an audio object outside the display screen. For example, by watching the rectangular frame image FR14, the user is able to recognize that there is an unseen audio object at the left side of the display screen as seen from the user.

Assume in this state that the user using a device selects by clicking, for example, the rectangular frame image FR12 displayed in a portion of the face area of the person HM12. This selecting operation allows the selection of the person HM12 with the rectangular frame image FR12 displayed.

Then, the rectangular frame image FR12 displayed for the selected person HM12 is displayed in highlighted manner. In this example, the rectangular frame image FR12 is drawn in solid lines, indicating that the rectangular frame image FR12 is displayed in a highlighted manner. This allows the user to visually understand which audio object has been selected.

By contrast, the rectangular frame image FR11, the rectangular frame image FR13, and the rectangular frame image FR14 of the unselected persons are drawn in dashed lines, indicating that these are not displayed in a highlighted manner, that is, in an ordinary manner. Therefore, when the rectangular frame image FR12 is selected, the rectangular frame image FR12 changes in display state from the ordinary display state drawn in dashed lines to the highlighted display state drawn in solid lines.

Further, in this example, along with the selection and highlighted display of the rectangular frame image FR12, an adjustment instruction image CT11 for adjusting the audio characteristics of the audio of the selected person HM12 in the proximity of the rectangular frame image FR12.

Here, for an example of the adjustment instruction image CT11, an image for the volume adjustment of the audio of the person HM12 is displayed. It should be noted that manipulating the adjustment instruction image allows not only volume adjustment but also sound quality adjustment. However, for the brevity of description, the following describes only an example of volume adjustment.

The user who is a device user can execute a manipulation on the arrow portion indicated in this adjustment instruction image CT11 so as to adjust the volume of the audio of the audio object more easily and intuitively. To be more specific, the user can raise the volume by touching the upper portion in the diagram in the arrow portion of the adjustment instruction image CT11 and, conversely, lower the volume by touching the lower portion in the diagram in the arrow portion. In addition, the volume up/down amounts can be determined by the number of times the user touches the arrow portion or the duration of time in which the user touches the arrow portion, for example.

Further, the user can press with a finger the rectangular frame image FR12 again in a state where the adjustment instruction image CT11 is displayed, thereby canceling the selection of the person HM12 so as to return the display to the state where the adjustment instruction image CT11 is not displayed.

Refer to the description of the flowchart illustrated in FIG. 2. In step S17, the manipulation unit 26 selects an audio object to be adjusted in audio characteristics in accordance with a manipulation by the user who is a device user.

For example, the selection of an audio object by the user is executed by specifying by the user the rectangular frame image displayed from that audio object, that is, the audio object information image. At this moment, the user can select only one audio object from one or more audio objects for the adjustment of audio characteristics or sequentially select two or more audio objects for the adjustment of audio characteristics.

The manipulation unit 26 selects an audio object in accordance with the manipulation for specifying the audio object information image by the user.

To be more specific, in the example illustrated in FIG. 6, for example, if the user executes a manipulation for touching by a finger the rectangular frame image FR12, the manipulation unit 26 selects the person HM12 corresponding to the rectangular frame image FR12 as the audio object on which to execute the adjustment of audio characteristics on the basis of the signal generated in accordance with a manipulation by the user to the manipulation unit 26.

As described above, the manipulation unit 26 for selecting the person corresponding to the rectangular frame image can function as an audio object selection unit for selecting an audio object in accordance with the manipulation done by the user.

Further, when an audio object to be adjusted in audio characteristics is selected, the manipulation unit 26 controls the video display unit 23 displays in a highlighted manner the rectangular frame image (an audio object information image) corresponding to the selected audio object and, at the same time, displays an adjustment instruction image in the proximity of this rectangular frame image. Consequently, in the example illustrated in FIG. 6, the rectangular frame image FR12 is displayed in a highlighted manner and, at the same time, the adjustment instruction image CT11 is displayed.

Then, the user who is a device user executes a manipulation on the adjustment instruction image, thereby giving an instruction for the adjustment of the audio characteristics of the audio of the audio object. It should be noted that not only the audio of an audio object but also the audio characteristics of a background sound may be adjusted.

In step S18, on the basis of the signal generated in accordance with a manipulation by the user on the adjustment instruction image, the manipulation unit 26 generates signal adjustment information for adjusting the audio characteristics of the audio of the selected audio object.

For example, if an instruction for volume adjustment of the audio of the audio object is given, for example, the manipulation unit 26 generates the signal adjustment information for raising or lowering the volume by an instructed amount. In this case, the signal adjustment information includes the information indicative of the adjustment amount of volume, that is, the amount for raising or lowering volume as a parameter, for example.

Further, if an instruction for volume adjustment of the audio of the audio object is given, for example, the manipulation unit 26 selects a filter coefficient for use in the filter processing for adding an effect corresponding to that instruction so as to generate the signal adjustment information that includes the information indicative of the selected filter coefficient as a parameter.

The signal adjustment information generated as described above includes a parameter related with audio such as the information indicative of a volume adjustment information and the information indicative of a filter coefficient, that is, a parameter indicative of the degree of adjustment in adjusting audio characteristics. Therefore, the manipulation unit 26 can also function as a parameter setting unit that sets a parameter for the adjustment of audio characteristics in accordance with a manipulation done by the user so as to generate the signal adjustment information including the set parameter.

The manipulation unit 26 supplies the signal adjustment information generated as described above to the signal adjustment unit 27 and the signal adjustment unit 29 or the signal adjustment unit 27 and the signal adjustment unit 29.

In step S19, the signal adjustment unit 27 or the signal adjustment unit 29 adjusts the audio characteristics on the basis of the signal adjustment information supplied from the manipulation unit 26.

If the signal adjustment information is supplied only to the signal adjustment unit 27, for example, the signal adjustment unit 27 adjusts such audio characteristics as volume adjustment and sound quality adjustment on the audio object signal supplied from the audio object decoding unit 24 on the basis of the signal adjustment information supplied from the manipulation unit 26. Next, the signal adjustment unit 27 supplies the audio object signal adjusted in audio characteristics to the rendering processing unit 30. Further, the signal adjustment unit 29 supplies the background sound signal supplied from the background sound decoding unit 28 to the rendering processing unit 30 without change.

To be more specific, the signal adjustment unit 27 executes, for example, volume adjustment by amplifying or attenuating the amplitude of the audio object signal on the basis of the signal adjustment information. Further, the signal adjustment unit 27 executes sound quality adjustment by executing filter processing on the audio object signal by use of a filter coefficient indicated by the signal adjustment information, thereby adding an effect to the audio, for example.

By contrast, if the signal adjustment information is supplied only to the signal adjustment unit 29, for example, the signal adjustment unit 29 executes the adjustment of such audio characteristics as volume adjustment and sound quality adjustment on the background sound signal supplied from the background sound decoding unit 28 on the basis of the signal adjustment information supplied from the manipulation unit 26. Next, the signal adjustment unit 29 supplies the background sound signal adjusted in audio characteristics to the rendering processing unit 30. Further, the signal adjustment unit 27 supplies the audio object signal supplied from the audio object decoding unit 24 to the rendering processing unit 30 without change.

Further, if the signal adjustment information is supplied to both of the signal adjustment unit 27 and the signal adjustment unit 29, for example, then the adjustment of audio characteristics is executed on the audio object signal and the background sound signal in the signal adjustment unit 27 and the signal adjustment unit 29, respectively. Next, the audio object signal and background sound signal adjusted in audio characteristics are supplied to the rendering processing unit 30.

Here, there are various types of methods of adjusting audio characteristics; that is, the adjustment of audio characteristics may be executed by any methods as long as the adjustment of the audio characteristics of the audio of an audio object specified by the user can be realized. For example, it is also practicable to relatively increase the volume of the audio of the selected audio object by decreasing the amplitudes of all audio object signals and background sound signals other than the audio object signal of the selected audio object.

Further, it is also practicable to adjust audio characteristics in the rendering processing unit 30 by changing gain information gain_factor[i] included in the audio object information illustrated in FIG. 3 rather than directly adjusting the amplitudes and so on of an audio object signal and a background sound signal.

In such a case, the manipulation unit 26 generates the signal adjustment information that includes the information indicative of a variation of gain information gain_factor[i] as a parameter and supplies the generated information to the rendering processing unit 30. This information indicative of a variation of gain information is the information for adjusting the volume of audio, so that this information may be as a parameter related with the audio of an audio object.

On the basis of the signal adjustment information from the manipulation unit 26, the rendering processing unit 30 changes the gain information included in the audio object information supplied from the audio object decoding unit 24 and, by use of the changed gain information, executes the processing of step S20 to be described below.

In step S20, on the basis of the audio object information supplied from the audio object decoding unit 24, the rendering processing unit 30 executes the rendering processing on the audio object signal supplied from the signal adjustment unit 27.

In addition, the rendering processing unit 30 executes mixing processing for synthesizing the audio object signal obtained by the rendering processing with the background sound signal supplied from the signal adjustment unit 29 and outputs a resultant output audio signal, upon which the content reproduction processing ends.

For example, in the video/audio processing apparatus 11, a background sound signal is reproduced in a so-called multi-channel stereo scheme such as related-art 2-channel or 5.1-channel scheme.

By contrast, for an audio object signal, an audio object rendering scheme is described in reference document 1 by which rendering is executed in the rendering processing unit 30, thereby reproducing audio. To be more specific, by a scheme called VBAP (Vector Base Amplitude Panning), each audio object signal is mapped to a speaker in reproduction environment, thereby reproducing audio.

That is, in the rendering processing unit 30, the gain information included in the audio object information illustrated in FIG. 3 is multiplied by an audio object signal so as to execute gain adjustment and the processing in the VBAP is executed on the basis of the audio object signal adjusted in gain.

With VBAP, an audio object signal is mapped, with a gain specified for each speaker, to the three speakers nearest to the position of the audio object in the space indicated by the object positional information included in the audio object information illustrated in FIG. 3.

As described above, the VBAP is a technology of executing sound localization at a location in the space of an audio object by use of the outputs of three speakers located nearest to the position of the audio object in the space indicated by the object positional information.

For the details of the VBAP, for example, refer to "Virtual Sound Source Positioning Using Vector Base Amplitude Panning, AES Volume 45 Issue 6 pp. 456-266, June 1997" (also referred to as reference document 2 in the following). It should be noted that, in reference documents 1 and 2, the number of speakers is 3; however, it is also practicable to execute sound localization with 4 or more speakers.

Further, in the above, an example was described in which a background sound signal is encoded and decoded by the multi-channel stereo scheme; however, it is also practicable to use a scheme in which a space in the proximity of a viewer referred to as HOA (Higher Order Ambisonic) described in the standard of reference document 1 is expressed with a spherical harmonics function as orthogonal base.

As described above, the video/audio processing apparatus 11 generates an audio object information image on the basis of audio object information so as to display the generated audio object information image on the image of content in a superimposed manner and, at the same time, generates the signal adjustment information in accordance with a manipulation done by the user so as to adjust the audio characteristics of the audio.

Thus, displaying an audio object information image obtained by audio object information on the image of content in a superimposed manner allows the user to simply and intuitively select an audio object, thereby executing the adjustment of the audio characteristics of volume adjustment and so on.

A Second Embodiment

<A Configurational Example of the Audio Processing Apparatus>

Meanwhile, in the first embodiment described above, an example was used in which an audio object information image obtained by use of the object positional information of an audio object is displayed on an image (or a video) of content in a superimposed manner. However, the present technology is also applicable if no video is accompanied as content.

In the second embodiment, the case where no video bit stream is included in an input bit stream, that is, the case where only an audio object bit stream and a background sound bit stream are included in an input bit stream is described.

Figure 7:
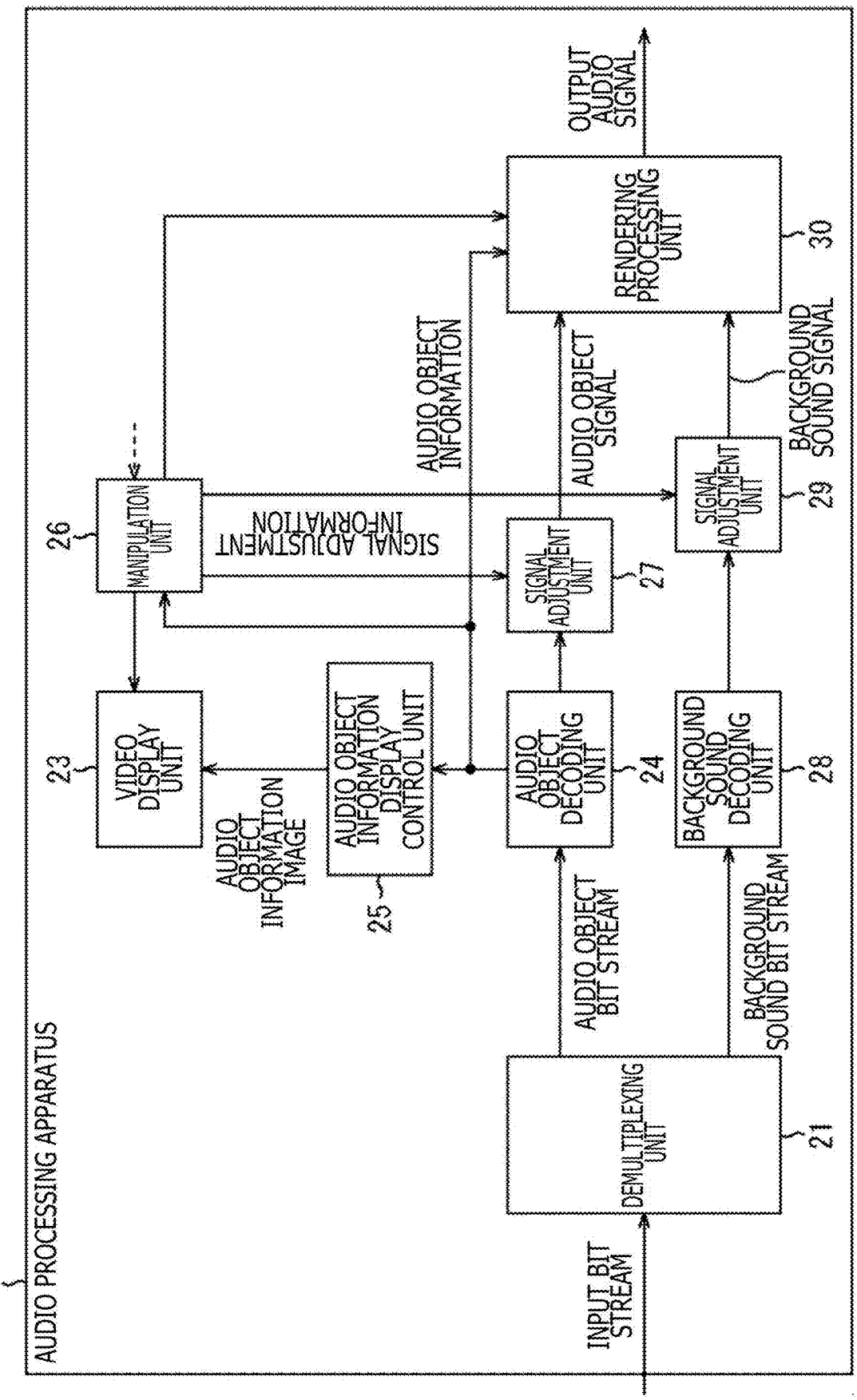
FIG. 7 is a diagram illustrating a configurational example of an audio processing apparatus.

In such a case, an audio processing apparatus to which the present technology is applied has a configuration as illustrated in FIG. 7, for example. It should be noted that, with reference to FIG. 7, components similar to those in FIG. 1 are denoted by the same reference numerals and the description thereof will be skipped.

An audio processing apparatus 81 illustrated in FIG. 7 has a demultiplexing unit 21, a video display unit 23, an audio object decoding unit 24, an audio object information display control unit 25, a manipulation unit 26, a signal adjustment unit 27, a background sound decoding unit 28, a signal adjustment unit 29, and a rendering processing unit 30.

The configuration of this audio processing apparatus 81 is different from the configuration of the video/audio processing apparatus 11 in that the video decoding unit 22 is not arranged and generally similar to the configuration of the video/audio processing apparatus 11 in other points.

However, in the audio processing apparatus 81, the audio object information obtained by the audio object decoding unit 24 is also supplied to the manipulation unit 26. Further, in accordance with a manipulation done by the user who is a device user, the manipulation unit 26 appropriately changes the object positional information of an audio object, thereby supplying the changed object positional information to the rendering processing unit 30.

For example, if the content of only pure audio that does not involve video is produced, the position of an audio object can be changed to a given position. This is because, if video is included in content, moving the position of an audio object causes an offset between the position of the audio object and the position of a video object corresponding to the audio object; however, in the case of content having only audio, such an offset is not caused.

Also in this case, audio object information is included in an audio object bit stream, so that an audio object information image can be displayed on the video display unit 23. Therefore, by watching this audio object information image, the user who is a device user is able to manipulate or edit content while visually checking the position of the audio object. Such an embodiment is suitable for the case in which a studio edit operation is executed on the content that includes only audio, for example.

Figure 8:
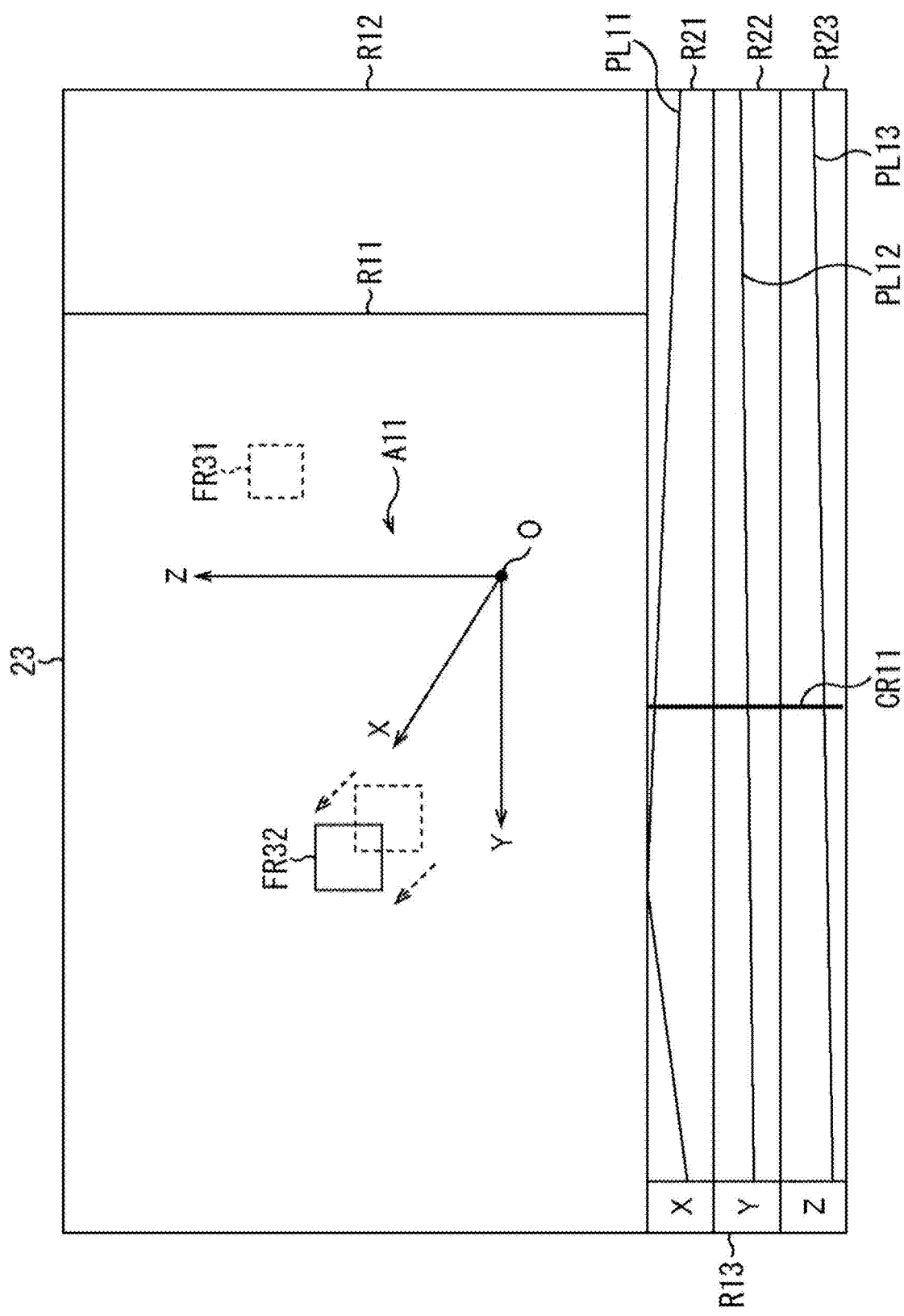
FIG. 8 is a diagram describing an audio object information image.

In the audio processing apparatus 81, an audio object information image is displayed as illustrated in FIG. 8, for example.

In the example illustrated in FIG. 8, a display screen of the video display unit 23 has an object position display region R11, an object metadata display region R12, and an object position time transition display region R13.

The object position display region R11 displays an audio object information image indicative of the position of an audio object. In the present embodiment, the audio object information image is displayed at a position indicated by the object positional information.

In this example, the object position display region R11 displays each axis of a three-dimensional orthogonal coordinate system indicated with arrow A11 and, at the same time, an audio object information image FR31 and an audio object information image FR32 respectively indicative of the position of each of two audio objects. Here, the three-dimensional orthogonal coordinate system indicated with arrow A11 is the three-dimensional orthogonal coordinate system having the X-axis, the Y-axis, and the Z-axis illustrated in FIG. 4.

Further, in this example, the audio object information image FR31 is drawn in dashed lines while the audio object information image FR 32 is drawn in solid lines, thereby indicating that the audio object information image FR32 is in a selected state as highlighted. That is, each of the audio object information images is displayed in a different display formats depending upon the state of selection. In FIG. 8, a manner in which the audio object information image FR 32 is being moved is displayed.

By watching an audio object information image displayed on the object position display region R11, the user who is a device user is able to visually check the position of an audio object in the space.

The object metadata display region R12 displays the metadata of the audio object in a selected state that has been extracted from the audio object bit stream, that is, the information included in the audio object information. For example, for the information included in the audio object information, object positional information and gain information are displayed.

The object position time transition display region R13 displays the position of the audio object information image in a selected state, that is, the position in the space at each time of the audio object in a selected state.

To be more specific, the object position time transition display region R13 has an X-coordinate display region R21, a Y-coordinate display region R22, and a Z-coordinate display region R23, the lateral directions of the X-coordinate display region R21, the Y-coordinate display region R22, and the Z-coordinate display region R23 being indicative of the time direction in the drawing.

Of the audio objects corresponding to the audio object information images displayed in the object position display region R11, the X-coordinate display region R21 displays position transition information PL11 indicative of the X-coordinate that is the position in the X-axis direction in the space at each time of the audio object in a selected state. In other words, the position transition information PL11 is the information indicative of the time transition of the X-coordinate of an audio object.

Likewise, the Y-coordinate display region R22 displays the position transition information PL12 indicative of the Y-coordinate that is the position in the Y-axis direction in the space at each time of the audio object in a selected state. The Y-coordinate display region R23 displays the position transition information PL13 indicative of the Z-coordinate that is the position in the Z-axis direction in the space at each time of the audio object in a selected state.

Further, a cursor CR11 is displayed at the position of one time on the time axis in each of the X-coordinate display region R21 through the Z-coordinate display region R23.

In this example, when the user who is a device user selects a desired audio object information image displayed in the object position display region R11 by manipulating the manipulation unit 26, the position transition information PL11 through the position transition information PL13 indicative of the position at each time of the audio object of the selected audio object information image are displayed. In the example illustrated in FIG. 8, the audio object corresponding to the audio object information image FR32 is in a selected state.

Further, by moving the cursor CR11 to a desired position in the time axis direction, the user is able to specify a predetermined time. When the time is specified by the cursor CR11, then the object position display region R11 displays, at the position in the space of each audio object at time indicated by the cursor CR11, the audio object information image of this audio object.

Therefore, in this example, the audio object information image FR32 in a selected state is displayed at the position in the space indicated by the X-coordinate, the Y-coordinate, and the Z-coordinate at which the cursor CR11 is positioned in the position transition information PL11 through the position transition information PL13.

If, in this state, the user moves the audio object information image FR32 in a selected state as illustrated in FIG. 8, the X-coordinate, the Y-coordinate, and the Z-coordinate of the time at which the cursor CR11 is positioned in the position transition information PL11 through the position transition information PL13 are changed. That is, a manipulation by the user of the audio object information image FR32 is reflected on the position transition information PL11 through the position transition information PL13.

Further, if the user changes the audio object information image in a selected state to the audio object information image FR31, the displaying of the object metadata display region R12 and the object position time transition region R13 is also updated to the displaying of the audio object information image FR31 newly put in a selected state.

Still further, in this example, in order to easily execute the manipulation of changing the positions in the space of an audio object, the user is also allowed to rotate or expand/shrink the three-dimensional orthogonal coordinate system itself indicated with arrow A11.

As described above, according to the audio processing apparatus 81, the jobs of manipulating and editing the audio objects included in an input bit stream can be easily executed while visually checking these manipulation and editing jobs.

In addition, in the example illustrated in FIG. 8, as with the case described with reference to FIG. 6, an audio object can be selected so as to display an adjustment instruction image and so on, thereby executing the adjustment of such audio characteristics as volume adjustment and sound quality adjustment on the selected audio object.

<Description of Content Reproduction Processing>

Figure 9:
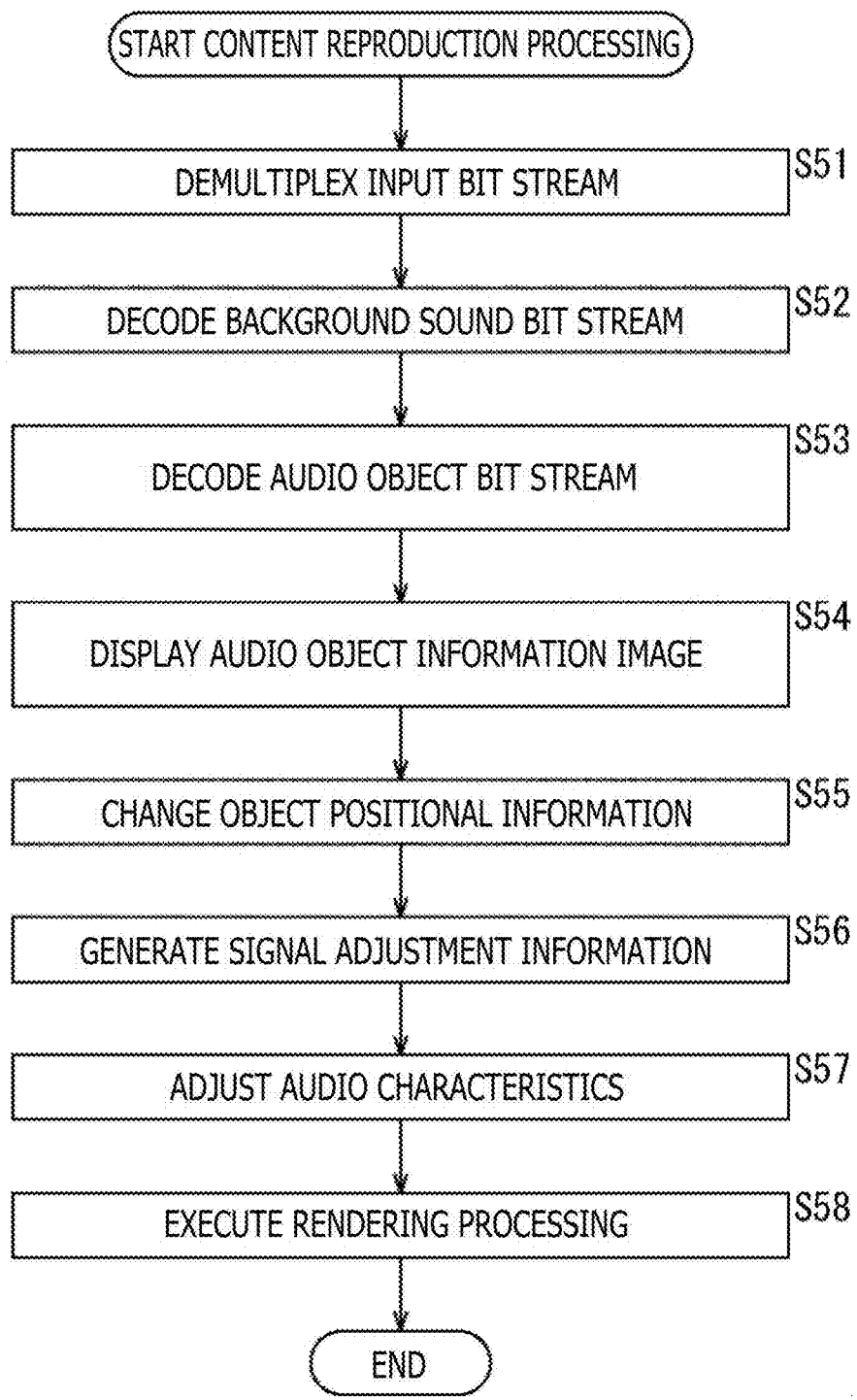
FIG. 9 is a flowchart describing content reproduction processing.

The following describes an operation of the audio processing apparatus 81. That is, the following describes the content reproduction processing to be executed by the audio processing apparatus 81 with reference to the flowchart illustrated in FIG. 9.

When the content reproduction processing starts, the processing of step S51 is executed; however, since this processing is similar to the processing of step S11 illustrated in FIG. 2, the description is skipped. It should be noted however that, in step S51, an input bit stream is demultiplexed into an audio object bit stream and a background sound bit stream.

When the input bit stream is demultiplexed, the processing operations of step S52 and step S53 are executed; however, since these processing operations are similar to the processing operations of step S13 and step S14 in FIG. 2, the description is skipped. It should be noted however, that, in step S53, the audio object information obtained by decoding of the audio object bit stream is supplied to the audio object information display control unit 25, the manipulation unit 26, and the rendering processing unit 30.

In step S54, on the basis of the audio object information supplied from the audio object decoding unit 24, the audio object information display control unit 25 controls the video display unit 23, thereby displaying the audio object information image.

That is, on the basis of the audio object information, the audio object information display control unit 25 generates an audio object information image and supplies the generated audio object information image to the video display unit 23 for displaying the audio object information image.

Consequently, for example, a screen illustrated in FIG. 8 is displayed on the video display unit 23. That is, by the processing of step S54, on the video display unit 23, the audio object information image is displayed at the position indicated by the object positional information included in the audio object information and, at the same time, the metadata and position transition information of the audio object are displayed.

When the audio object information image is displayed as described above, the user who is a device user manipulates the manipulation unit 26 to change the positions of an audio object and executes volume adjustment and sound quality adjustment.

In step S55, the manipulation unit 26 changes the object positional information of the audio object in accordance with a manipulation done by the user.

For example, in the example illustrated in FIG. 8, if the user moves the audio object information image FR32, the manipulation unit 26 changes the object positional information of the corresponding audio object in accordance with this movement of the audio object information image F32.

The object positional information, used for rendering processing, is the information for specifying the position of the audio object in the space, that is, the localization position of the sound image of the audio object in the space. Therefore, the processing of changing the object positional information may be the processing of setting parameters associated with the audio of an audio object.

In step S56, the manipulation unit 26 generates signal adjustment information in accordance with a manipulation done by the user. In step S56, the similar processing to that of step S18 in FIG. 2 is executed. It should be noted that, in step S56, the parameter for audio characteristics adjustment may be set in accordance with the movement of the position of an audio object information image, thereby generating the signal adjustment information that includes this parameter.

The manipulation unit 26 supplies the signal adjustment information generated as described above to the signal adjustment unit 27, the signal adjustment unit 29 or the signal adjustment unit 27 and the signal adjustment unit 29. In addition, the manipulation unit 26 supplies the changed object positional information obtained by the processing of step S55 to the rendering processing unit 30.

When the signal adjustment information is generated, the processing operations of step S57 and step S58 are subsequently executed, upon which the content reproduction processing ends; however, since these processing operations are similar to those of step S19 and step S20 in FIG. 2, the description is skipped.

It should be noted however that, in step S58, the rendering processing unit 30 executes rendering processing by use of the changed object positional information supplied from the manipulation unit 26 and the gain information included in the audio object information supplied from the audio object decoding unit 24.

As described above, on the basis of the audio object information, the audio processing apparatus 81 generates and displays an audio object information image and, at the same time, generates the signal adjustment information in accordance with a manipulation done by the user so as to adjust the audio characteristics of audio and change the object positional information. Consequently, the user can more easily and intuitively select an audio object so as to adjust audio characteristics and move the position of the audio object. That is, the user can easily execute the jobs of manipulating and editing an audio object while visually checking these jobs.

The sequence of processing operations can be executed by hardware as well as software. For the execution of the sequence of processing operations by software, the programs constituting that software are installed in a computer. It should be noted that the computer includes a computer assembled in dedicated hardware or a general-purpose personal computer capable of executing various functions by installing various programs, for example.

Figure 10:
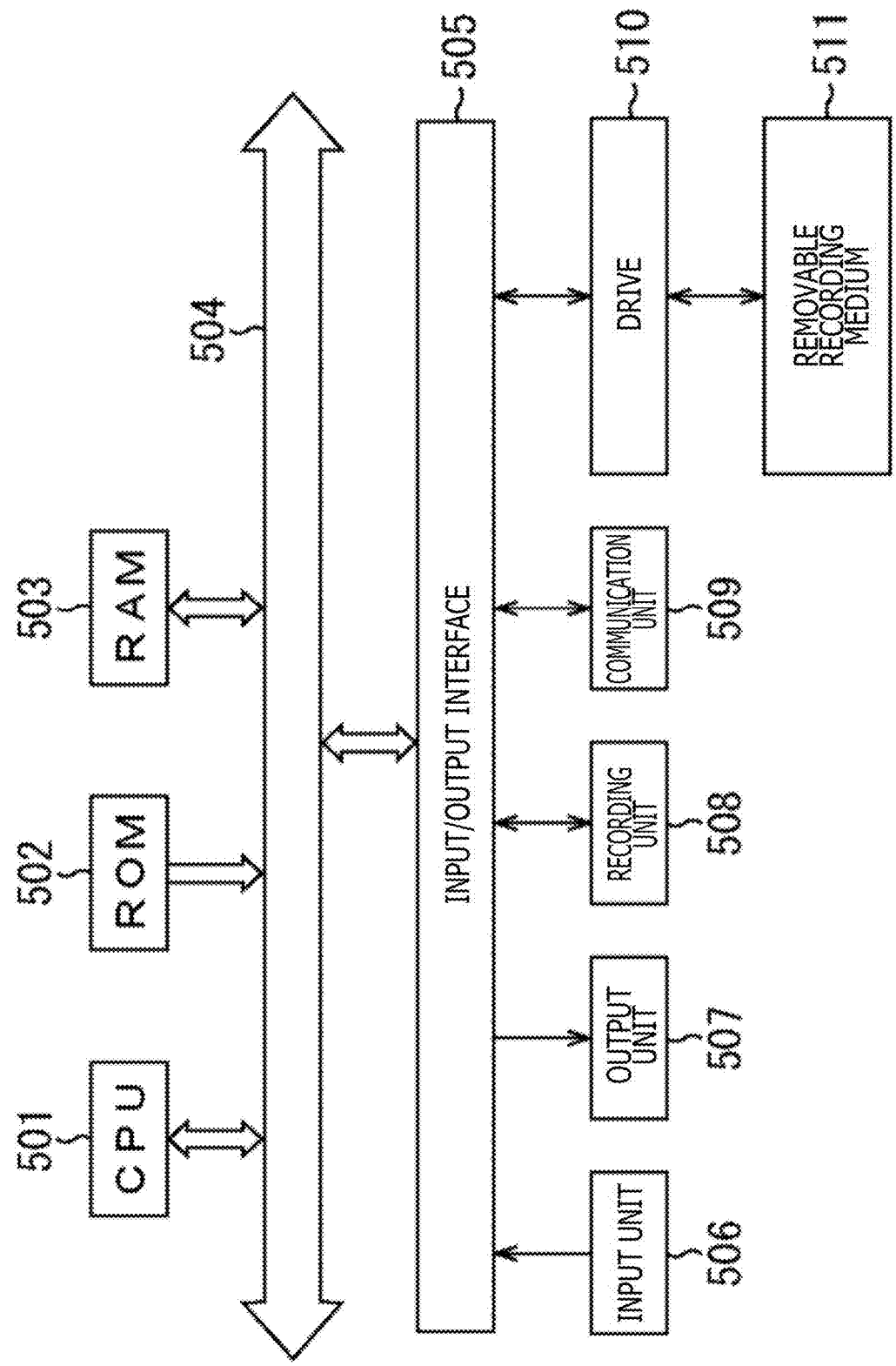
FIG. 10 is a diagram illustrating a configurational example of a computer.

FIG. 10 is a block diagram illustrating a configurational example of the hardware of a computer for executing the sequence of processing operations by programs.

In the computer, a CPU (Central Processing Unit) 501, a ROM (Read Only Memory) 502, and a RAM (Random Access Memory) 503 are interconnected by a bus 504.

The bus 504 is further connected to an input/output interface 505. The input/output interface 505 is connected to an input unit 506, an output unit 507, a recording unit 508, a communication unit 509, and a drive 510.

The input unit 506 includes a keyboard, a mouse, a microphone, and the like. The output unit 507 includes a display, a speaker, and the like. The recording unit 508 includes a hard disk drive and, a nonvolatile memory, and the like. The communication unit 509 includes a network interface and the like. The drive 510 drives a removable medium 511 such as a magnetic disc, an optical disc, a magneto-optical disc, a semiconductor memory, or the like.

In the computer configured as described above, the CPU 501 loads, for example, programs recorded in the recording unit 508 into the RAM 503 via the input/output interface 505 and the bus 504 and executes the loaded programs so as to execute the sequence of processing operations.

The programs to be executed by the computer (the CPU 501) can be provided as recorded to the removable medium 511 as package medium and the like, for example. In addition, the programs can be provided via a wired or wireless transmission medium such as a local area network, the Internet, or digital satellite broadcasting.

In the computer, programs can be installed in the recording unit 508 via the input/output interface 505 by loading the removable medium 511 in which the programs are installed onto the drive 510. Further, programs can be received by the communication unit 509 via a wired or wireless transmission medium so as to be installed in the recording unit 508. In addition, programs can be installed in the ROM 502 or the recording unit 508 in advance.

It should be noted that the programs to be executed by the computer may be the programs that are executed in time sequence along the sequence described herein or the programs that are executed in parallel as required on an on-demand basis.

It should be noted that the embodiments of the present technology are not limited to the embodiments described above and therefore changes and variations may be made to the embodiments without departing from the spirit of the present technology.

For example, the present technology can take a configuration of a cloud computer in which one function is dividedly and jointly processed by two or more apparatuses through a network.

Each step described in the flowcharts described above can be executed on one apparatus or on two or more apparatuses in a divided manner.

Further, if two or more processing operations are included in one step, there two or more processing operations included in that one step can be executed by one apparatus or two or more apparatuses in a divided manner.

It should be noted that the present technology can also take the following configuration.

(1)

An audio processing apparatus including:

a display control unit configured, on a basis of object positional information of an audio object, to cause a display unit to display an audio object information image indicative of a position of the audio object; and a selection unit configured to select the predetermined audio object from among one or a plurality of the audio objects.

(2)

The audio processing apparatus according to (1) above, further including:

a parameter setting unit configured to set a parameter related with audio of the audio object selected by the selection unit.

(3)

The audio processing apparatus according to (2) above, further including:

a signal adjustment unit configured, on a basis of the parameter, to execute processing of adjusting audio characteristics of audio of the audio object on at least one of an audio object signal of the audio object and a background sound signal of a background sound.

(4)

The audio processing apparatus according to (3) above, in which the parameter is a parameter for one of volume adjustment and sound quality adjustment.

(5)

The audio processing apparatus according to any one of (2) through (4) above, further including:

a rendering processing unit configured to execute rendering processing on an audio object signal of the audio object.

(6)

The audio processing apparatus according to (5) above, in which the parameter is a parameter for specifying a position of the audio object; and the rendering processing unit executes the rendering processing on the basis of the parameter.

(7)

The audio processing apparatus according to any one of (1) through (6) above, in which the display control unit causes the audio object information image to be displayed, in a superimposed manner, on a position determined by the object positional information on a video accompanied with the audio of the audio object displayed on the display unit.

(8)

The audio processing apparatus according to (7) above, in which if the position determined by the object positional information is outside a display screen of the display unit, the display control unit causes the audio object information image to be displayed at an end portion of the display screen.

(9)

The audio processing apparatus according to (7) or (8) above, in which the selection unit selects the audio object in accordance with a specification manipulation by a user at the position of the audio object information image.

(10)

The audio processing apparatus according to any one of (1) through (9) above, further including:

an audio object decoding unit configured to decode an audio object bit stream so as to obtain an audio object signal of the audio object and the object positional information.

(11)

An audio processing method including the steps of:

on a basis of object positional information of an audio object, causing a display unit to display an audio object information image indicative of a position of the audio object; and selecting the predetermined audio object from among one or a plurality of the audio objects.

(12)

A program for causing a computer to execute processing including the steps of:

on a basis of object positional information of an audio object, causing a display unit to display an audio object information image indicative of a position of the audio object; and selecting the predetermined audio object from among one or a plurality of the audio objects.

REFERENCE SIGNS LIST

11 . . . Video/audio processing apparatus, 21 . . . Demultiplexing unit, 23 . . . Video display unit, 24 . . . Audio object decoding unit, 25 . . . Audio object information display control unit, 26 . . . Manipulation unit, 27 . . . Signal adjustment unit, 28 . . . Background sound decoding unit, 29 . . . Signal adjustment unit, 30 . . . Rendering processing unit

The invention claimed is:

1. An audio processing apparatus comprising:
a demultiplexer configured to demultiplex an input signal into a video portion, a background portion, and an audio object portion;
an audio object decoder configured to decode the audio object portion into an audio object positional information of an audio object and an audio signal of the audio object;
a background decoder configured to decode the background portion into a background sound signal;
a video decoder configured to decode the video portion into a video signal;
a display controller configured to cause a display unit to display
a video image based on the video signal, and
an audio object information image indicative of a position of the audio object, the audio object information image being displayed in a superimposed manner relative to the video image such that the video image is visible under the audio object information image; and
a selector configured to select the audio object from among a plurality of audio objects.

2. The audio processing apparatus according to claim 1, further comprising:
a parameter setter configured to set a parameter related to audio of the audio object selected by the selector.

3. The audio processing apparatus according to claim 2, further comprising:
a signal adjuster configured, based on the parameter, to execute processing to adjust audio characteristics on one or both of: the audio signal of the audio object and the background sound signal.

4. The audio processing apparatus according to claim 3, wherein the parameter is a parameter for one of: volume adjustment and sound quality adjustment.

5. The audio processing apparatus according to claim 2, further comprising:

a rendering processor configured to execute a rendering process on the audio signal of the audio object.

6. The audio processing apparatus according to claim 5, wherein the parameter is a parameter for specifying a position of the audio object; and the rendering processor executes the rendering process based on the parameter.

7. The audio processing apparatus according to claim 1, wherein the display controller causes the audio object information image to be displayed at a position determined by object positional information decoded from the audio object portion of the input signal.

8. The audio processing apparatus according to claim 7, wherein, if the position determined by the object positional information is outside a display screen of the display unit, the display controller causes the audio object information image to be displayed at an end portion of the display screen.

9. The audio processing apparatus according to claim 7, wherein the selector selects the audio object in accordance with a specification manipulation by a user at the position of the audio object information image on a display screen of the display unit.

10. An audio processing method comprising:

demultiplexing an input signal into a video portion, a background portion, and an audio object portion;

decoding the audio object portion into audio object positional information of an audio object and an audio signal of the audio object;

decoding the background portion into a background sound signal;

decode the video portion into a video signal;

causing a display unit to display a video image based on the video signal and an audio object information image indicative of a position of the audio object, the audio object information image being displayed in a superimposed manner relative to the video image such that the video image is visible under the audio object information image; and selecting the audio object from among a plurality of audio objects.

11. A non-transitory computer-readable storage medium storing a program that when executed causes a computer to perform an audio processing method, wherein the method comprises:

demultiplexing an input signal into a video portion, a background portion, and an audio object portion;

decoding the audio object portion into an audio object positional information of an audio object and an audio signal of the audio object;

decoding the background portion into a background sound signal;

decode the video portion into a video signal;

causing a display unit to display a video image based on the video signal and an audio object information image indicative of a position of the audio object, the audio object information image being displayed in a superimposed manner relative to the video image such that the video image is visible under the audio object information image; and selecting the audio object from among a plurality of audio objects.

* * * * *